United States Patent
English (10) Patent No.: US 12,110,675 B2
(45) Date of Patent: Oct. 8, 2024

(54) EFFLUENT ELEVATOR SYSTEM AND METHODS OF USING

(71) Applicant: Johnny R. English, Willard, NC (US)

(72) Inventor: Johnny R. English, Willard, NC (US)

(*) Notice: Subject to any disclaimer, the term of this patent is extended or adjusted under 35 U.S.C. 154(b) by 395 days.

(21) Appl. No.: 17/829,433

(22) Filed: Jun. 1, 2022

(65) Prior Publication Data
US 2023/0392363 A1 Dec. 7, 2023

(51) Int. Cl.
| | | |
|---|---|---|
| E03F 5/22 | (2006.01) | |
| C02F 3/22 | (2023.01) | |
| F04F 1/18 | (2006.01) | |
| C02F 103/00 | (2006.01) | |

(52) U.S. Cl.
CPC .............. *E03F 5/22* (2013.01); *C02F 3/223* (2013.01); *F04F 1/18* (2013.01); *C02F 2103/005* (2013.01)

(58) Field of Classification Search
CPC .............. E03F 5/22; C02F 3/223; F04F 1/18
USPC .................................. 417/108–109, 118–119
See application file for complete search history.

(56) References Cited

U.S. PATENT DOCUMENTS

| | | | | |
|---|---|---|---|---|
| 2,717,774 A | * | 4/1921 | Obma | C02F 3/223 |
| | | | | 239/113 |
| 1,374,952 A | * | 7/1932 | Rogers | F04F 1/20 |
| | | | | 417/109 |
| 1,865,873 A | * | 7/1932 | Miller | F04F 1/18 |
| | | | | 417/109 |
| 2,716,509 A | * | 8/1955 | Saul | B23Q 11/1084 |
| | | | | 417/186 |
| 3,078,809 A | | 2/1963 | Wakefield | |
| 3,592,560 A | * | 7/1971 | Mitchell | H02P 29/40 |
| | | | | 417/116 |
| 6,162,020 A | * | 12/2000 | Kondo | F04F 1/08 |
| | | | | 417/54 |
| 6,582,156 B1 | | 6/2003 | Flowers | |
| 9,217,244 B2 | | 12/2015 | Early et al. | |
| 9,878,931 B2 | | 1/2018 | An et al. | |
| 10,322,957 B2 | | 6/2019 | Graves | |
| 11,234,681 B2 | | 2/2022 | Jay-Russell et al. | |
| 2006/0226071 A1 | * | 10/2006 | Allen | C02F 3/1242 |
| | | | | 210/220 |
| 2007/0034558 A1 | * | 2/2007 | Kondo | C02F 3/12 |
| | | | | 210/903 |

(Continued)

FOREIGN PATENT DOCUMENTS

DE 202016100805 U1 * 4/2016 ............... C02F 3/00

*Primary Examiner* — Thomas Fink
(74) *Attorney, Agent, or Firm* — Ashley D. Johnson; Dogwood Patent and Trademark Law (57) ABSTRACT

The invention is a system of raising an effluent level of a septic system drainfield. The system includes an outer housing comprising an inlet in fluid communication with a septic tank. The housing further includes an outlet that enables the effluent to exit the system at a higher elevation. The housing interior includes a hollow insert that extends above a bottom surface of the housing. A baffle is positioned within the interior of the housing to surround the insert, dividing the housing interior into two compartments with insert passing therethrough. In use, wastewater effluent enters the housing interior from a septic tank and gravity falls into the bottom of the housing. An air pump can then be initiated to pump air into the system, which lifts the effluent into the housing upper compartment, where it will exit the system at a higher elevation.

20 Claims, 9 Drawing Sheets

(56) References Cited

U.S. PATENT DOCUMENTS

| | | | | |
|---|---|---|---|---|
| 2007/0166171 A1* | 7/2007 | Kondo | ............ | F04F 1/18 |
| | | | | 417/118 |
| 2013/0020501 A1* | 1/2013 | McKinney | ............ | C02F 1/325 |
| | | | | 250/437 |
| 2014/0246104 A1* | 9/2014 | Kondo | ............ | F04F 1/08 |
| | | | | 137/565.17 |
| 2017/0129787 A1* | 5/2017 | Fehring, Sr. | ............ | C02F 1/325 |
| 2020/0344966 A1* | 11/2020 | Lefers | ............ | A01K 63/047 |

* cited by examiner

EFFLUENT ELEVATOR SYSTEM AND METHODS OF USING

TECHNICAL FIELD

The presently disclosed subject matter relates to an effluent elevator system, and to methods of making and using the disclosed system.

BACKGROUND

Figure 1:
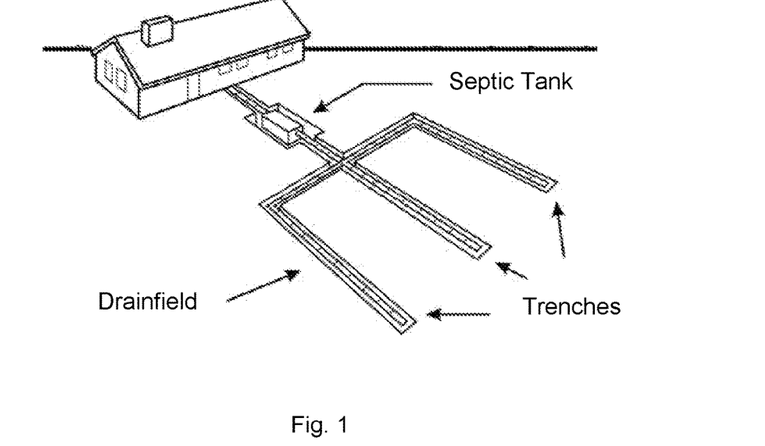
FIG. 1 is a perspective view of a common septic system comprising a septic tank, a drainfield, and the soil beneath the drainfield.

Septic systems are used to safely treat and dispose of wastewater produced in a home bathroom, kitchen, and laundry when centralized sewage treatment plants are not accessible. The wastewater can include disease-causing germs and pollutants that must be treated to protect human health and the environment. Traditional septic systems include a septic tank, a drainfield, and the soil beneath the drainfield, as illustrated in FIG. 1. The septic tank is a watertight container about 9 feet long and 5 feet tall buried in the ground just outside the home. The tank is usually precast from reinforced concrete, although tanks made from plastic or fiberglass may also be used. While a septic tank is typically designed with a 1,000-gallon liquid capacity, its size is determined by the number of bedrooms in the home.

Figure 2:
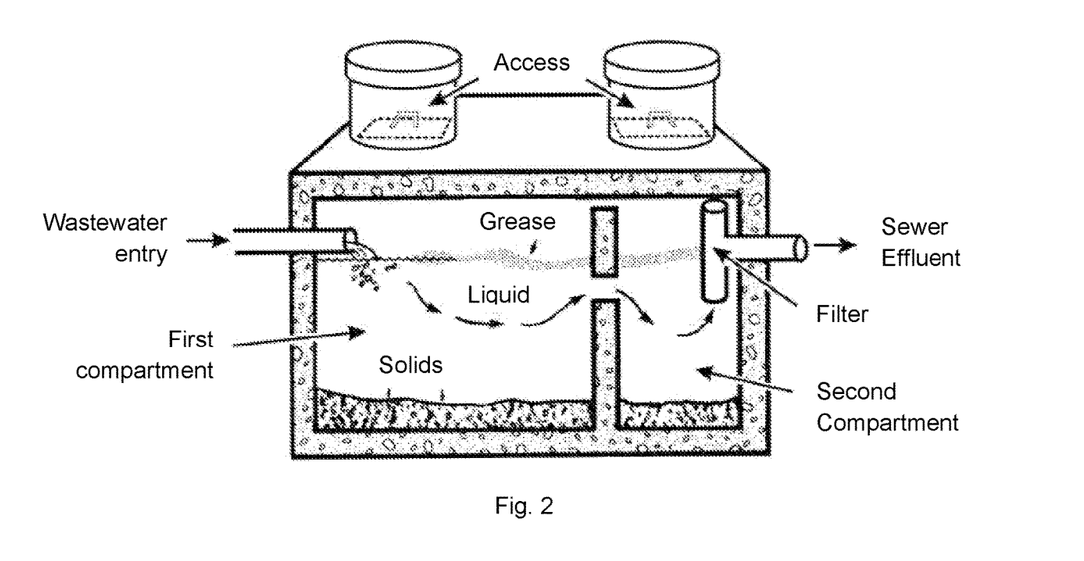
FIG. 2 is a perspective view of a common septic tank in accordance with some embodiments of the presently disclosed subject matter.

The septic tank temporarily holds household wastes and allows a small amount of pretreatment to take place. As illustrated in FIG. 2, when wastewater material enters the septic tank, it separates into solids (sinking to the bottom of the tank), oils and greases that rise to the top of the fluid in the tank, and water that sits between the layers. Water exits the septic tank through the drain lines as effluent. The drain lines are typically positioned about one to three feet beneath the soil (and usually in gravel beds). As the water runs from the drain lines, it reacts with the soil and the natural microbes, resulting in clean water that is safe for the environment. The drainfield is where water from the septic tank eventually disperses via the drain lines. In some embodiments, the effluent can flow to a treatment unit or a receiving water body.

Updated local and state regulations are frequently changing. Currently, new regulations require that when septic repairs are made, the drainfield be higher than the original level of the drainfield. The lifting of a drainfield from a lower to a higher elevation has been accomplished using complicated and expensive systems including sumps and pumps requiring attention and upkeep. It would therefore be beneficial to provide a system and method of raising the water level of septic system drainfield to a higher elevation.

SUMMARY

In some embodiments, the presently disclosed subject matter is directed to an effluent elevator system for raising the water level of effluent. Specifically, the system comprises a housing defined by a closed bottom face and an opposed open top face and an interior. The housing also includes an inlet in communication with a source of effluent, the inlet positioned adjacent to bottom face of the housing. The housing includes an outlet positioned adjacent to the top face of the housing. The system includes an insert positioned within the interior of the housing, the insert defined by open upper and lower faces and an interior passageway therebetween. The system comprises a baffle defined by a body and a central aperture that fits around the insert, wherein the baffle is positioned within the housing interior, creating an upper compartment and a lower compartment. The system includes an injection port positioned on the insert in the lower compartment of the housing.

In some embodiments, the effluent source is an exit of a septic tank.

In some embodiments, the outlet is a septic drainfield.

In some embodiments, the housing top face includes a removable cap.

In some embodiments, the distance between the inlet and outlet is about 4-50 inches.

In some embodiments, the inlet, outlet, or both comprises a valve.

In some embodiments, the housing has a length of about 1-10 feet.

In some embodiments, the housing has an inner diameter of about 1-10 inches.

In some embodiments, the housing and insert are constructed from PVC.

In some embodiments, the system further includes an air source in fluid communication with the injection port.

In some embodiments, the presently disclosed subject matter is directed to a method of raising the effluent level of a septic system drainfield. Specifically, the method comprises connecting a pathway from a septic tank, allowing effluent to enter the inlet of an effluent elevator system. The effluent elevator system is defined by a housing comprising a closed bottom face and an opposed open top face; an interior; an inlet in communication with a source of effluent, the inlet positioned adjacent to bottom face of the housing; and an outlet positioned adjacent to the top face of the housing. The system includes an insert positioned within the interior of the housing, the insert defined by open upper and lower faces and an interior passageway therebetween. The system further comprises a baffle defined by a body and a central aperture that fits around the insert, wherein the baffle is positioned within the housing interior, creating an upper compartment and a lower compartment. An injection port is positioned on the insert in the lower compartment of the housing. The method includes connecting an air source to the injection port, wherein the effluent travels from the lower compartment into the interior of the insert to the upper compartment to exit the housing outlet, whereby the effluent level of the drainfield has been raised.

In some embodiments, the flow rate of the effluent into the system is about 50-200 L/minute.

In some embodiments, the air source is an aerator pump.

In some embodiments, the aerator pump has a flow rate of about 100 L/minute.

In some embodiments, the effluent level is raised about 4-50 inches.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 3:
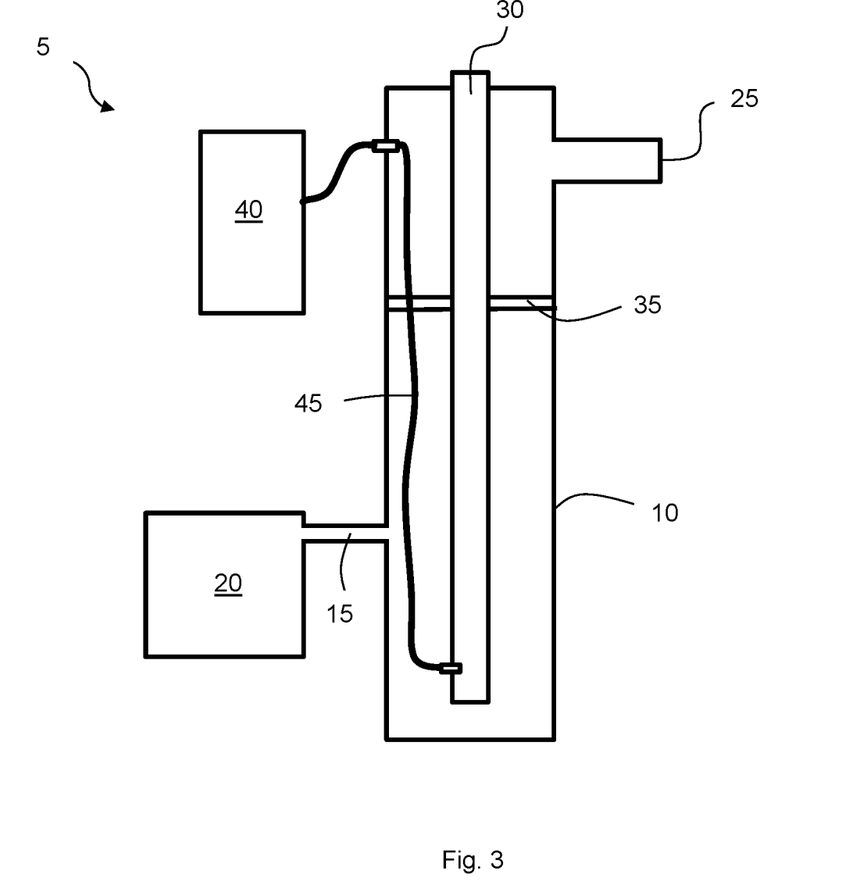
FIG. 3 is a cross-sectional view of a system in accordance with some embodiments of the presently disclosed subject matter.

As disclosed above, septic systems are used to safely treat and dispose of wastewater produced in a home environment. Traditional septic systems include a septic tank, a drainfield, and the soil beneath the drainfield. In response to current state and local regulations, the presently disclosed system can be used to raise the water level of a septic system drainfield from a first elevation to a second, higher elevation. As illustrated in FIG. 3, system 5 includes outer housing 10 that is configured to hold and protect the inner system components. The housing includes inlet 15 that is in fluid communication with septic tank 20 and allows effluent exiting the septic tank to enter the system. The housing further includes outlet 25 that enables the effluent to exit the system at a higher elevation, as described in detail below. The housing interior includes hollow insert 30 that extends above a bottom surface of the housing. Baffle 35 is positioned within the interior of the housing to surround insert 30, dividing the housing interior into two compartments with insert 30 passing therethrough. Air pump 40 pumps air into the interior of the housing via tubing 45. In use, wastewater effluent enters the housing interior from septic tank 20 at inlet 15 and gravity falls into the bottom of the housing. Air pump 40 can then be initiated to pump air into the system, which lifts the effluent into the upper compartment, where it will exit the system at a higher elevation at outlet 25.

The term "effluent" refers to any fluid that exits a septic tank. For example, the effluent is of the type generated from a typical residence and can flow from bathtubs, clothes washers, dishwashers, water coolers, kitchen sinks, bathroom sinks, shower stalls, toilets, whirlpools baths, and the like.

Figures 4A, 4B:
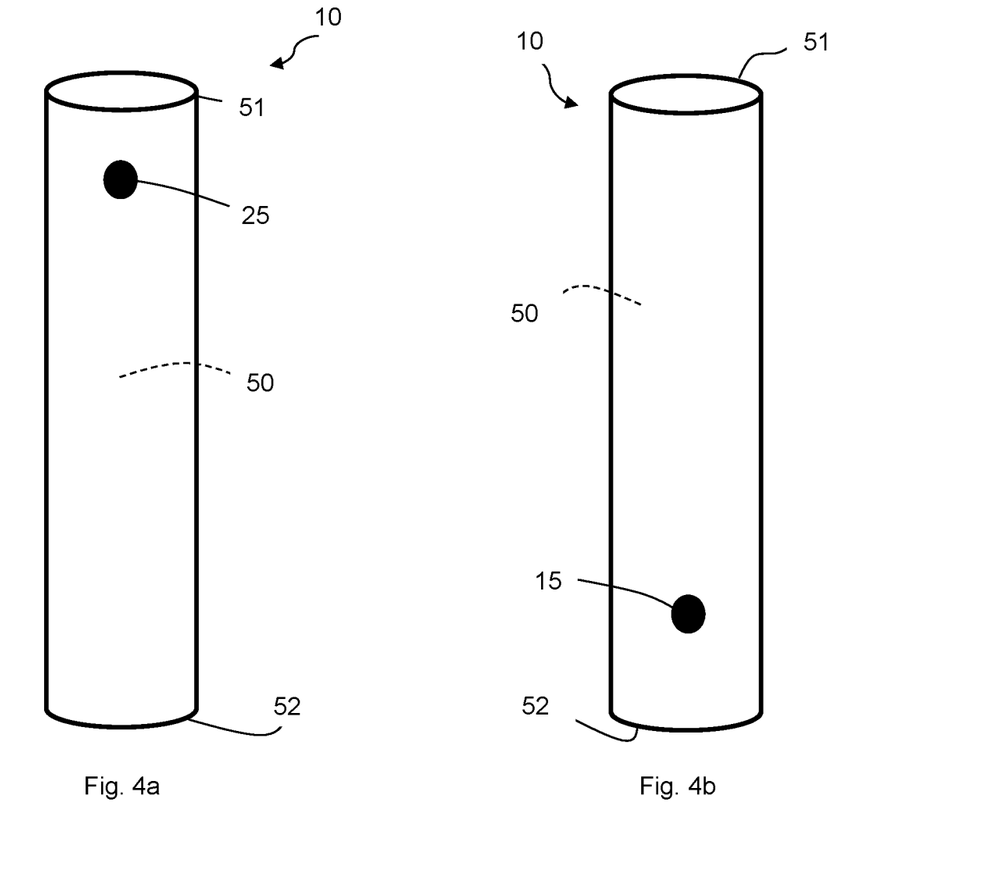
FIG. 4a is a perspective view of a system housing in accordance with some embodiments of the presently disclosed subject matter.
FIG. 4b is a perspective view of a system housing in accordance with some embodiments of the presently disclosed subject matter.

As set forth above, the disclosed system includes housing 10 comprising inlet 15 and outlet 25. As shown in FIGS. 4a and 4b, the housing includes hollow interior 50 with open top face 51 and closed bottom face 52. In some embodiments, the open top face can include a removable cap and the closed bottom face can include a permanent cap. The open top face is in fluid communication with the housing interior. As shown in FIG. 4a, the housing includes outlet 25 that provides an exit for effluent passed through the disclosed system. The term "outlet" refers to an opening or passageway through which flowable product can exit the system into the environment outside the housing. The outlet can therefore be configured as an opening or aperture that passes through a wall of the housing. The housing outlet can include tubing or other conduits to direct the effluent to a desired location after it exits system 5. The outlet can be positioned at or adjacent to top face 51 of the housing. For example, outlet 25 can be positioned about 0.1-10 inches from the top edge of the housing (e.g., at least/no more than about 0.1, 0.5, 1, 2, 3, 4, 5, 6, 7, 8, 9, or 10 inches).

As shown in FIG. 4b, the housing also includes inlet 15 that provides an entryway, allowing effluent to pass into the interior of the housing. The term "inlet" therefore refers to any opening or passageway at the start of a flow path through which a flowable product is received into the housing interior. The inlet can include tubing or other conduits to form a passageway from the septic tank to the interior of the housing. The inlet can be configured at or adjacent to the bottom edge of the housing (e.g., about 0.1-10 inches from bottom end 52). Thus, the inlet can be positioned at least/no more than about 0.1, 0.5, 1, 2, 3, 4, 5, 6, 7, 8, 9, or 10 inches from the housing bottom end.

Figure 5:
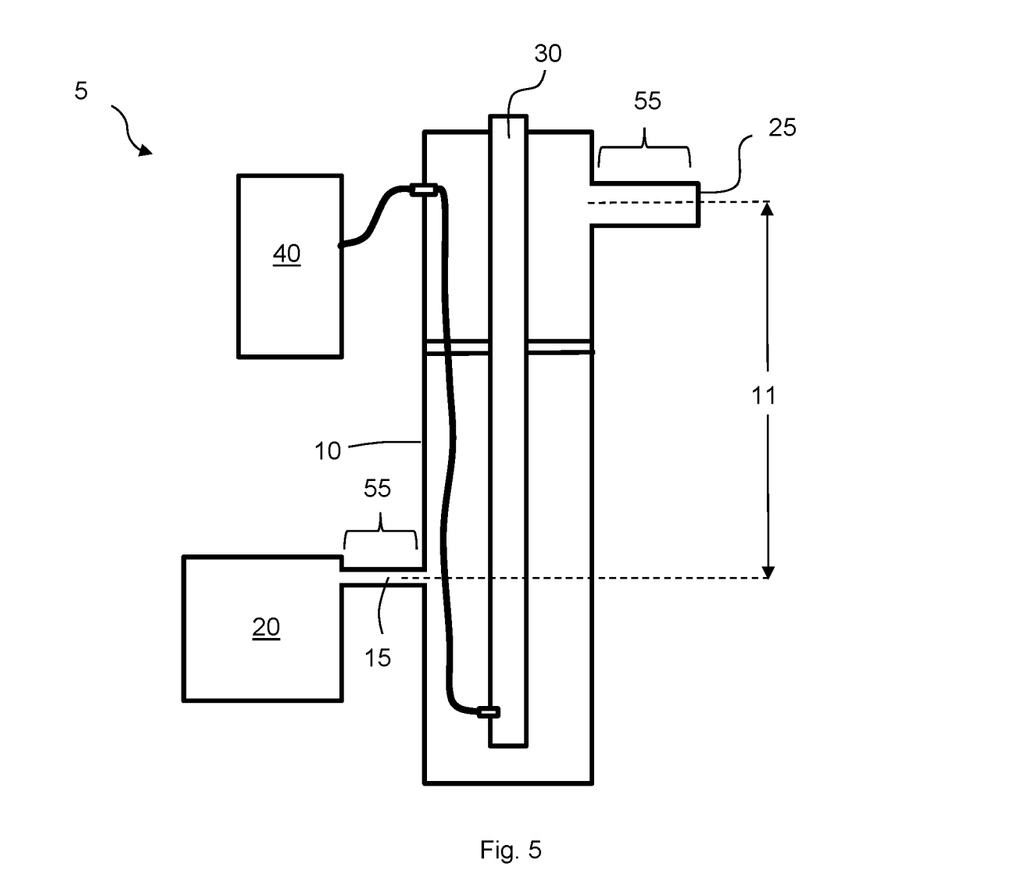
FIG. 5 is a cross-sectional view of a system in accordance with some embodiments of the presently disclosed subject matter.

It should be appreciated that the distance the effluent is raised (e.g., the level of decrease in the depth of the drainfield) is determined by the distance between the housing inlet and outlet. Stated another way, effluent enters the system at a first depth (e.g., at a depth of inlet 15 from the septic tank). The effluent passes through the system and exits at a second depth (e.g., the depth of outlet 25). Therefore, distance 11 is the distance that a septic drainfield is raised by the disclosed system. In some embodiments, the distance can be about 4-50 inches (e.g., at least/no more than about 4, 5, 10, 15, 20, 25, 35, 40, 45, or 50 inches), as shown in FIG. 5. However, distance 11 is not limited and can be greater or less than the cited range.

Inlet and/or outlet 15, 25 can optionally include one or more valves to regulate the flow of effluent into and/or out of system 5. Any type of valve can be used, such as (but not limited to) a ball valve, butterfly valve, gate valve, globe valve, check valve, stop valve, and the like.

Any mechanism can be used to create the housing inlet and outlet, such as (but not limited to) the use of mechanical devices (drills, etc.), laser cutting, and the like.

In some embodiments, conduit 55 can be used to direct the flow of fluid into the inlet and/or away from outlet 25, as shown in FIG. 5. The term "conduit" can therefore include tubing, arms, or any other passageways that allow the passage of fluid into or from the housing interior. Conduit 55 can releasably or permanently attach over or to the inlet or outlet of the housing using adhesive, welding, fasteners (e.g., clips), magnets, or any other element. In typical installations, the conduit is at least 3 inches in diameter although any size conduit can be used.

Figure 6A:
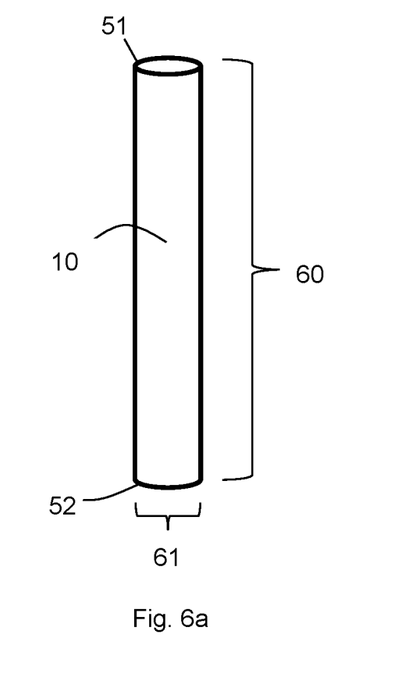
FIG. 6a is a perspective view of a system housing in accordance with some embodiments of the presently disclosed subject matter.
Figure 6B:
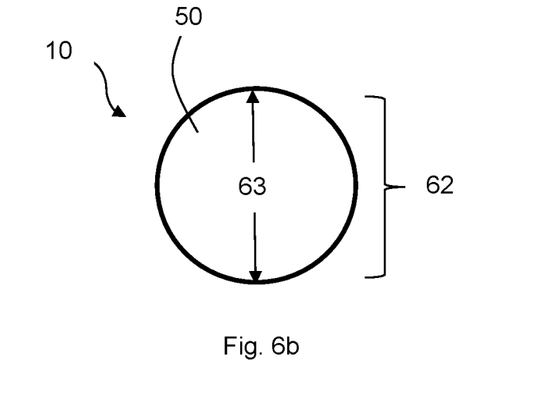
FIG. 6b is a cross-sectional view of a system housing in accordance with some embodiments of the presently disclosed subject matter.

Housing 10 can have any suitable length 60, as shown in FIG. 6a. The term "length" refers to the longest vertical distance from top face 51 to bottom face 52 of the housing. In some embodiments, the housing can have length 60 of about 1-10 feet (e.g., at least/no more than about 1, 2, 3, 4, 5, 6, 7, 8, 9, or 10 feet). The housing can further include width 61 of about 1-10 inches (e.g., at least/no more than about 1, 2, 3, 4, 5, 6, 7, 8, 9, or 10 inches), as shown in FIG. 6a. The term "width" refers to the longest horizontal distance of the housing (such as from a leftmost outer edge to a rightmost outer edge). The housing can include thickness 62 of about 1-10 inches (e.g., at least/no more than about 1, 2, 3, 4, 5, 6, 7, 8, 9, or 10 inches), as shown in FIG. 6b. The term "thickness" refers to the longest straight-line distance perpendicular to both the length and width.

Housing 10 also includes interior diameter 63, as illustrated in FIG. 6b. The interior diameter can be about 1-10 inches (e.g., at least/no more than about 1, 2, 3, 4, 5, 6, 7, 8, 9, or 10 inches).

It should be appreciated that the dimensions of housing 10 are not limited and the length, width, thickness, and/or interior diameter can be outside the ranges given above.

The housing can have any desired cross-sectional shape, such as round, oval, square, rectangular, triangular, and the like.

Housing 10 can be constructed from any suitable rigid material, such as (but not limited to) plastic (e.g., PVC pipe), metal (e.g., stainless steel), reinforced concrete, or combinations thereof.

Figure 7A:
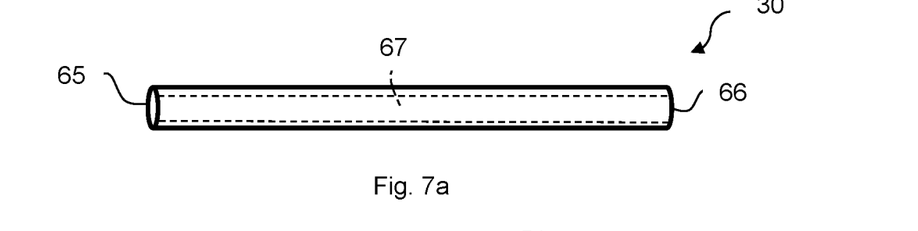
FIG. 7a is a perspective view of a system insert in accordance with some embodiments of the presently disclosed subject matter.

System 5 includes insert 30 positioned within interior 50 of the housing, as shown in FIG. 3. Insert 30 can be hollow and open on both ends (e.g., with first and second ends 65, 66 and central passageway 67), as shown in FIG. 7a. As discussed in detail below, the insert acts as a passageway for effluent as it is raised from a first height to a second height.

Insert 30 can have any suitable length (e.g., about 1-10 feet), width (about 1-5 inches), and thickness (about 1-5 inches). However, the length, width, and thickness of are not limited, and the insert can be configured with any suitable dimensions.

Generally, the cross-sectional diameter of the insert is governed by the desired flow rate of effluent through system 5. In various embodiments, a target effluent flow rate is from about 50-200 L/min (e.g., at least/no more than about 50, 75, 100, 125, 150, 175, or 200 L/min). However, any suitable flow rate can be used.

Figure 7B:
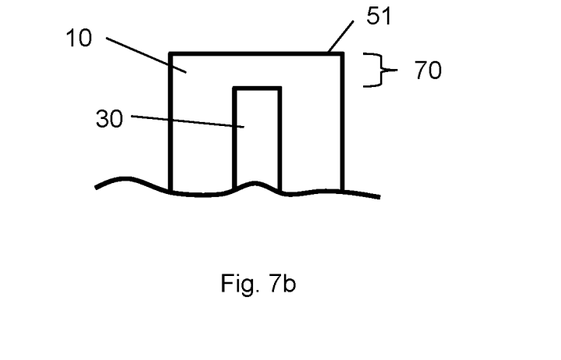
FIG. 7b is a fragmentary view of an insert positioned within a system housing in accordance with some embodiments of the presently disclosed subject matter.

As discussed above, insert 30 is positioned within interior 50 of housing 10. Specifically, the insert is configured to extend in an upward direction, just above or below top face 51 of the housing as illustrated in FIG. 7b (e.g., above the high water line of the insert). In some embodiments, distance 70 between the top face of the housing and the top face of the insert can be about 1-5 inches (e.g., at least/no more than about 1, 2, 3, 4, or 5 inches above or below the top face of the housing). Alternatively, the top face of the insert can extend about 1-5 inches above the top face of the housing.

Figure 7C:
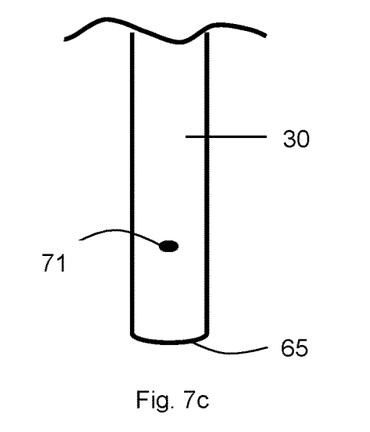
FIG. 7c is a fragmentary view of an insert in accordance with some embodiments of the presently disclosed subject matter.

Insert 30 also includes injection port 71 that cooperates with an air source to inject air into the interior of the insert, as shown in FIG. 7c. The injection port can be positioned adjacent to bottom end 65 of the insert (e.g., about 1-10 inches from the bottom insert end). The injection port provides for one-way airflow from outside the housing to the interior of insert 30. Any suitable air source can be used, such as (but not limited to) a 100 L/m in aerator pump. When the air source is not in use, a volume of water (e.g., about 2 inches of water) can remain in the bottom of the housing. The standing water will obstruct air flow from going into the septic tank but allows a constant air flow to the drain lines. Advantageously, oxygen helps grow bacteria to treat residual effluent and prolong the life of the drain field.

Figure 8A:
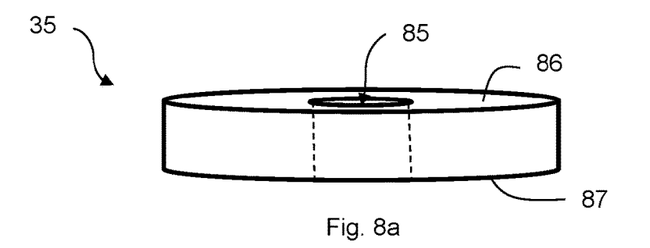
FIG. 8a is a perspective view of a baffle in accordance with some embodiments of the presently disclosed subject matter.
Figure 8B:
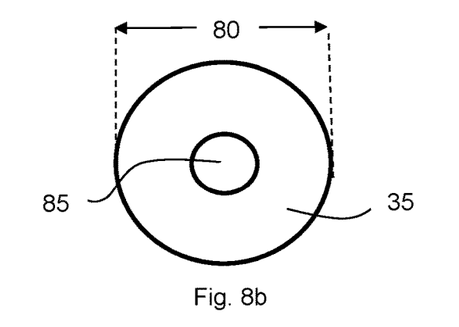
FIG. 8b is a top plan view of a baffle in accordance with some embodiments of the presently disclosed subject matter.
Figure 8C:
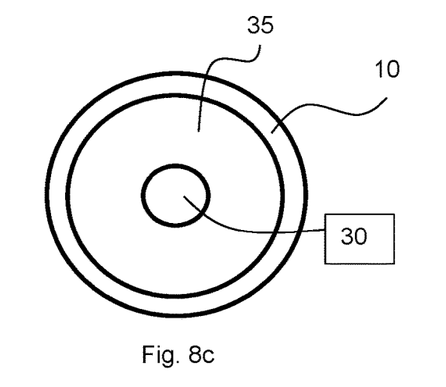
FIG. 8c is a top plan view of a baffle positioned in a housing in accordance with some embodiments of the presently disclosed subject matter.

System 5 also includes baffle 35 configured between the insert and the inner surface of the housing. Stated another way, the baffle extends around the exterior of insert 30 and extends to contact the interior of the housing. The term "baffle" refers to any barrier that inhibits, blocks, controls, and/or redirects bulk movement of a fluid below the baffle. One embodiment of baffle 35 is shown in FIGS. 8a-8c. As illustrated, the baffle includes length 80 that corresponds to the interior diameter of housing 10. The shape of baffle 35 is also configured to mimic the shape of housing interior 50 (e.g., a circular housing can require a circular baffle). In this way, fluid is blocked from flowing above the baffle.

The baffle includes opening 85 that extends from top face 86 to bottom face 87. The opening is sized and shaped to allow insert 30 to extend through. In some embodiments, opening 85 is sized and shaped to accommodate the insert. Thus, the baffle creates a separation of the housing interior, forcing the flow of fluid up the interior tubing passageway as discussed below. Importantly, the baffle is positioned between the housing inlet and outlet and separates the housing into upper and lower compartments.

Figure 9A:
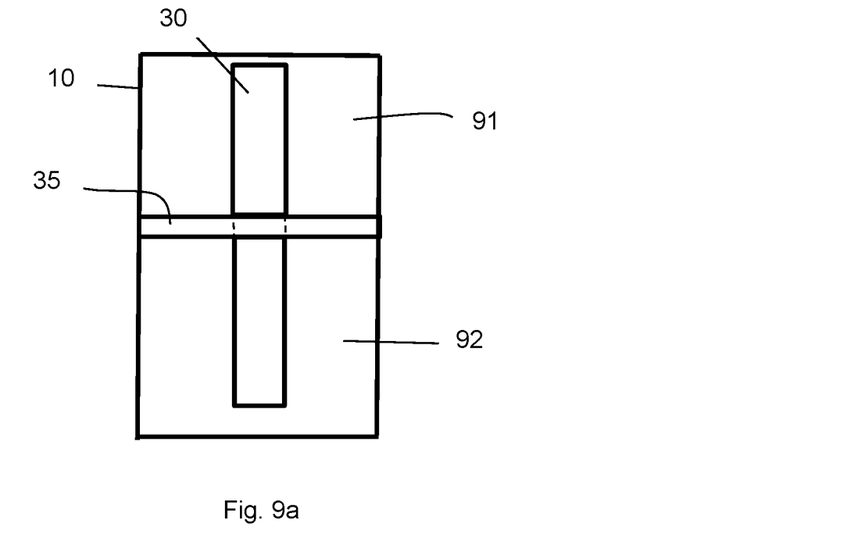
FIGS. 9a-9c are cross-sectional views of a baffle positioned in a housing in accordance with some embodiments of the presently disclosed subject matter.
Figure 9B:
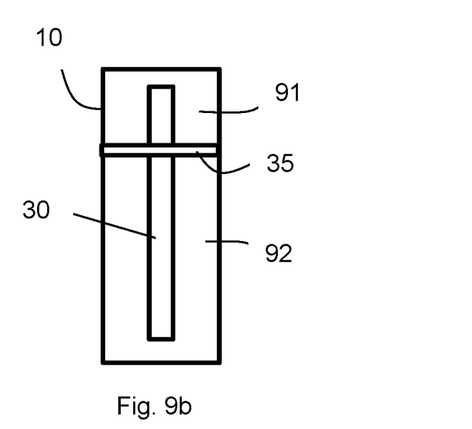
Figure 9C:
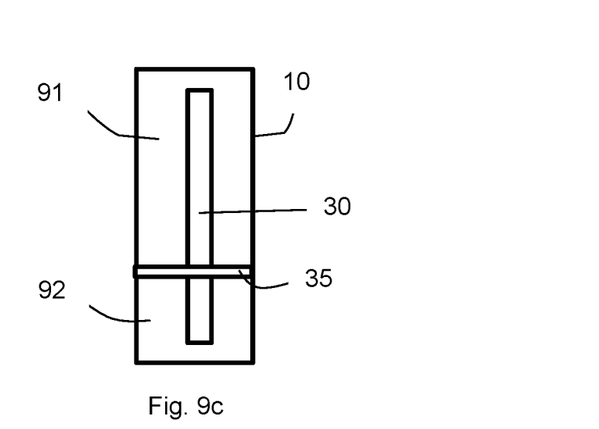

The baffle can be positioned in the approximate middle section of the housing, as shown in FIG. 9a. Alternatively, the baffle can be positioned at any location, creating upper compartment 91 or lower compartment 92, shown in FIGS. 9b and 9c. Thus, the baffle can be positioned about 25-75 percent of the distance from the top face of the housing. For example, if the housing has a length of 10 feet, the baffle can be positioned 2.5 feet to 7.5 feet from the top face of the housing (e.g., 2.5, 3, 3.5, 4, 4.5, 5, 5.5, 6, 6.5, 7, or 7.5 feet from the housing top face).

Baffle 35 can be constructed from any suitable material, such as plastic, metal, and the like.

Figure 10:
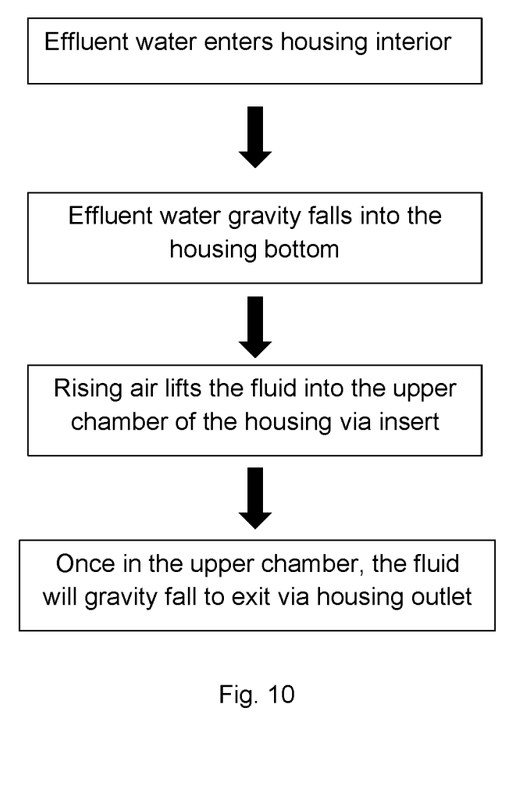
FIG. 10 is a schematic of one method of using the disclosed system.
Figure 11A:
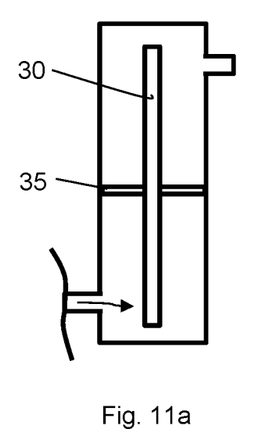
FIGS. 11a-11d are cross-sectional views illustrating use of the system to raise the level of effluent in accordance with some embodiments of the presently disclosed subject matter.
Figure 11B:
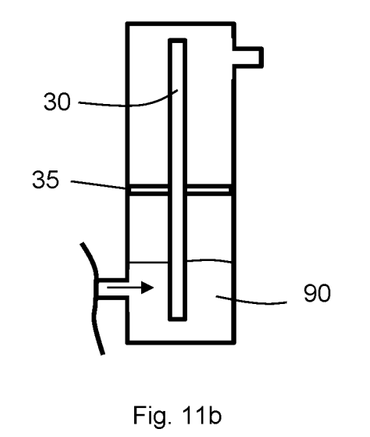
Figure 11C:
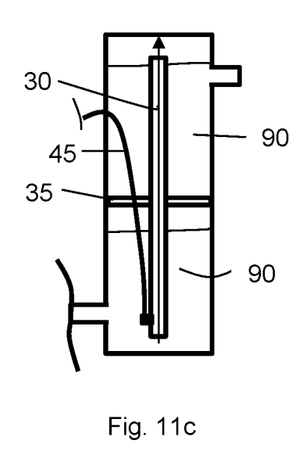
Figure 11D:
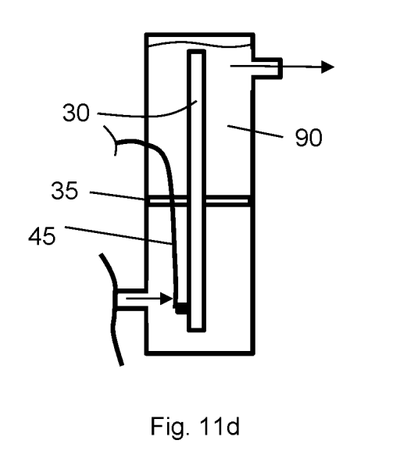

In use, effluent water enters the system from septic tank 20 at inlet 15, as shown in the schematic of FIG. 10. As illustrated by the arrows in FIGS. 11a and 11b, effluent 90 will gravity fall from the system inlet into the bottom of the housing interior lower chamber. The air source will feed air into the interior of the insert. Because the baffle prevents fluid from rising into the upper portion of the housing, the fluid will travel through the insert in an upward direction. The rising air will lift the water into the upper chamber of the housing, as shown in FIG. 11c. From the upper chamber the water will gravity fall to exit the system via outlet 25, as shown in FIG. 11d. As a result, the drain field will be higher than originally designed, which can comply with new rules and regulations. In some embodiments, drain field can be raised by about 4-50 inches (e.g., at least/no more than about 4, 5, 10, 15, 20, 25, 30, 35, 40, 45, or 50 inches). However, the drain field can be raised to any desired level.

The disclosed system provides many advantages over prior art systems. For example, system 5 is relatively inexpensive to construct, providing a cost-effective solution to raising the fluid level of septic system.

In addition, the effluent is lifted in an even and gentle manner.

Advantageously, the disclosed system and method provide for substantially continuous flow of effluent into the drainfield.

The disclosed system is easy to install, allowing users to comply with new regulations in a seamless and efficient manner.

The presently disclosed subject matter is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications can be made to the embodiments described above without departing from the scope of the present invention, as defined by the appended claims.

What is claimed is:

1. An effluent elevator system for raising the water level of effluent, the system comprising:
   a housing defined by:
      a closed bottom face and an opposed open top face;
      an interior;
      an inlet in communication with a source of effluent, the inlet positioned adjacent to bottom face of the housing;
      an outlet positioned adjacent to the top face of the housing;
      an insert positioned within the interior of the housing, the insert defined by open upper and lower faces and an interior passageway therebetween;
      a baffle defined by a body and a central aperture that fits around the insert, wherein the baffle is positioned within the housing interior, creating an upper compartment and a lower compartment; and
      an air injection port positioned on the insert in the lower compartment of the housing.

2. The system of claim 1, wherein the effluent source is an exit of a septic tank.

3. The system of claim 1, wherein the outlet is a septic drainfield.

4. The system of claim 1, wherein the housing top face includes a removable cap.

5. The system of claim 1, wherein the distance between the inlet and outlet is about 4-50 inches.

6. The system of claim 1, wherein the inlet, outlet, or both comprises a valve.

7. The system of claim 1, wherein the housing has a length of about 1-10 feet.

8. The system of claim 1, wherein the housing has an inner diameter of about 1-10 inches.

9. The system of claim 1, wherein the housing and insert are constructed from PVC.

10. The system of claim 1, further comprising an air source in fluid communication with the air injection port.

11. A method of raising the effluent level of a septic system drainfield, the method comprising:
   connecting a pathway from a septic tank, allowing effluent to enter the inlet of an effluent elevator system, the effluent elevator system defined by:
      a housing defined by:
         a closed bottom face and an opposed open top face;
         an interior;
         an inlet in communication with a source of effluent, the inlet positioned adjacent to bottom face of the housing;
         an outlet positioned adjacent to the top face of the housing;
         an insert positioned within the interior of the housing, the insert defined by open upper and lower faces and an interior passageway therebetween;
         a baffle defined by a body and a central aperture that fits around the insert, wherein the baffle is positioned within the housing interior, creating an upper compartment and a lower compartment; and
         an air injection port positioned on the insert in the lower compartment of the housing;
   connecting an air source to the air injection port;
   wherein the effluent travels from the lower compartment into the interior of the insert to the upper compartment to exit the housing outlet, whereby the effluent level of the drainfield has been raised.

12. The method of claim 11, wherein the flow rate of the effluent into the system is about 50-200 L/minute.

13. The method of claim 11, wherein the air source is an aerator pump.

14. The method of claim 13, wherein the aerator pump has a flow rate of about 100 L/minute.

15. The method of claim 11, wherein the effluent level of the drainfield is raised about 4-50 inches.

16. The method of claim 11, wherein the housing top face includes a removable cap.

17. The method of claim 11, wherein the distance between the inlet and outlet is about inches.

18. The method of claim 11, wherein the inlet, outlet, or both comprises a valve.

19. The method of claim 11, wherein the housing has an inner diameter of about 1-10 inches.

20. The method of claim 11, wherein the housing and insert are constructed from PVC.

\* \* \* \* \*